(12) United States Patent
Herger et al.

(10) Patent No.: US 9,798,299 B2
(45) Date of Patent: Oct. 24, 2017

(54) PREVENTING SUBSTRATE PENETRATING DEVICES FROM DAMAGING OBSCURED OBJECTS

(71) Applicant: International Business Machines Corporation, Armonk, NY (US)

(72) Inventors: Lorraine M. Herger, Port Chester, NY (US); Neal M. Keller, Pleasantville, NY (US); Matthew A. McCarthy, Holly Springs, NC (US); Clifford A. Pickover, Yorktown Heights, NY (US); James R. Kozloski, New Fairfield, CT (US); Andrew Wyskida, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 14/310,004

(22) Filed: Jun. 20, 2014

(65) Prior Publication Data
US 2015/0369597 A1 Dec. 24, 2015

(51) Int. Cl.
*G01V 3/165* (2006.01)
*G05B 13/02* (2006.01)

(52) U.S. Cl.
CPC ......... *G05B 13/0205* (2013.01); *G01V 3/165* (2013.01)

(58) Field of Classification Search
None
See application file for complete search history.

(56) References Cited

U.S. PATENT DOCUMENTS

| 5,617,031 | A | 4/1997 | Tuttle |
| 7,737,965 | B2 | 6/2010 | Alter et al. |
| 8,264,226 | B1 | 9/2012 | Olsson et al. |
| 8,314,713 | B2 | 11/2012 | McAdam |

(Continued)

FOREIGN PATENT DOCUMENTS

| EP | 0 933 653 | 4/1999 |
| EP | 0 722 601 | 10/2003 |
| EP | 2 003 535 | 12/2008 |

OTHER PUBLICATIONS

Behzadan, A.H., "Scalable Algorithm for Resolving Incorrect Occlusion in Dynamic Augmented Reality Engineering Environments," Computer-Aided Civil and Infrastructure Engineering 25 (2010) 3-19; copyright 2009, DOI: 10.1111/j.1467-8667.2009.00601.x.

(Continued)

*Primary Examiner* — Gregory J Toatley
*Assistant Examiner* — Terence Stifter, Jr.
(74) *Attorney, Agent, or Firm* — Fleit Gibbons Gutman Bongini Bianco PL; Thomas S. Grzesik

(57) ABSTRACT

Various embodiments manage the operation of a substrate penetrating device. In one embodiment, a set of location information associated with a substrate penetrating device is received. At least one database including information associated with obstructed objects is queried based on the set of location information. A determination is made, based on the querying, that the area where the substrate penetrating device is operating includes at least one obstructed object. A probability is calculated with respect to the substrate penetrating device encountering the at least one obstructed object while operating in the area.

16 Claims, 5 Drawing Sheets

(56) References Cited

U.S. PATENT DOCUMENTS

| | | | |
|---|---|---|---|
| 8,356,255 B2 | 1/2013 | Nielsen et al. | |
| 8,358,120 B2 | 1/2013 | Huebler | |
| 8,427,163 B2 | 4/2013 | Sickler, Jr. | |
| 2002/0184235 A1* | 12/2002 | Young | G01V 1/00 |
| 2003/0210228 A1 | 11/2003 | Ebersole et al. | |
| 2010/0164990 A1 | 7/2010 | Van Doorn | |
| 2010/0225299 A1* | 9/2010 | Nguyen | G01V 3/10 |
| | | | 324/67 |
| 2012/0256917 A1 | 10/2012 | Lieberman et al. | |
| 2014/0200863 A1* | 7/2014 | Kamat | G01C 15/00 |
| | | | 703/1 |
| 2015/0077121 A1* | 3/2015 | Branson | G01V 3/081 |
| | | | 324/326 |

OTHER PUBLICATIONS

Collins, L., et al., "An Improved Bayesian Decision Theoretic Approach for Land Mine Detection," IEEE Transactions on Geoscience and Remote Sensing, vol. 37, No. 2, Mar. 1999, 0196-2892/99$10.00 copyright 1999 IEEE.

Roberts, G.W., et al., "The Use of Augmented Reality, GPS and INS for Subsurface Data Visualisation," TS5.13 Integration of Techniques, FIG XXII International Congress, Washington, D.C. USA, Apr. 19-26, 2002.

"Hand Held Metallic Mine Detector Performance Baselining Collection Plan," Prepared by Joint Unexploded Ordnance Coordination Office (JUXOCO), Fort Belvoir, Virginia, May 1998 to Nov. 1998, Draft May 26, 1998, c:/eoir/26may98.doc Jan. 6, 1999 11:37 AM.

* cited by examiner

PREVENTING SUBSTRATE PENETRATING DEVICES FROM DAMAGING OBSCURED OBJECTS

BACKGROUND

The present disclosure generally relates to substrate penetrating devices, and more particularly relates to preventing damage to obscured objects by a substrate penetrating device.

All too often, a professional contractor or a do-it-yourself homeowner is required to penetrate the surface of either the ground or a wall inside of a building. Without detailed information, such as building diagrams or utilities maps, this can be costly and dangerous to a person blindly penetrating a surface.

BRIEF SUMMARY

In one embodiment, a method for managing the operation of a substrate penetrating device is disclosed. The method comprises receiving a set of location information associated with a substrate penetrating device. At least one database comprising information associated with obstructed objects is queried based on the set of location information. A determination is made, based on the querying, that the area where the substrate penetrating device is operating comprises at least one obstructed object. A probability is calculated with respect to the substrate penetrating device encountering the at least one obstructed object while operating in the area.

In another embodiment, an information processing system for managing the operation of a substrate penetrating device is disclosed. The information processing system comprises memory and a processor that is communicatively coupled to the memory. A damage prevention system is communicatively coupled to the memory and the processor. The damage prevention system is configured to perform a method. The method comprises receiving a set of location information associated with a substrate penetrating device. At least one database comprising information associated with obstructed objects is queried based on the set of location information. A determination is made, based on the querying, that the area where the substrate penetrating device is operating comprises at least one obstructed object. A probability is calculated with respect to the substrate penetrating device encountering the at least one obstructed object while operating in the area.

In a further embodiment, a computer program storage product for managing the operation of a substrate penetrating device is disclosed. The computer program storage product comprises instructions configured to perform a method. The method comprises receiving a set of location information associated with a substrate penetrating device. At least one database comprising information associated with obstructed objects is queried based on the set of location information. A determination is made, based on the querying, that the area where the substrate penetrating device is operating comprises at least one obstructed object. A probability is calculated with respect to the substrate penetrating device encountering the at least one obstructed object while operating in the area.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

As discussed above, blindly penetrating a surface such the ground or a wall can be dangerous for the operator and/or any objects buried in the ground or wall. Conventional mechanisms for identifying the location of the hidden objects usually require a user to manually mark the location of a hidden object, and then penetrate the surface in a careful manner. This is a static point in time when that information will be relevant to the worker. One or more embodiments, on the other hand, provide a trans-vendor service to automatically determine the probability (confidence level) that surface penetration will not lead to the rupture, tearing, or contact with any hidden object. This confidence level is built based on the use of information gathered from various sources (i.e. database of information related to buried objects) and real-time sensor-based monitoring attached to the tool that is performing the penetration. The computed value is feed into a motor control device that determines if the penetration is approaching an unsafe distance from virtually identified objects. Once this distance reaches a pre-determined value, the motor control device prevents the tool from engaging (i.e. stop the motor), unless overridden.

Operating Environment

Figure 1:
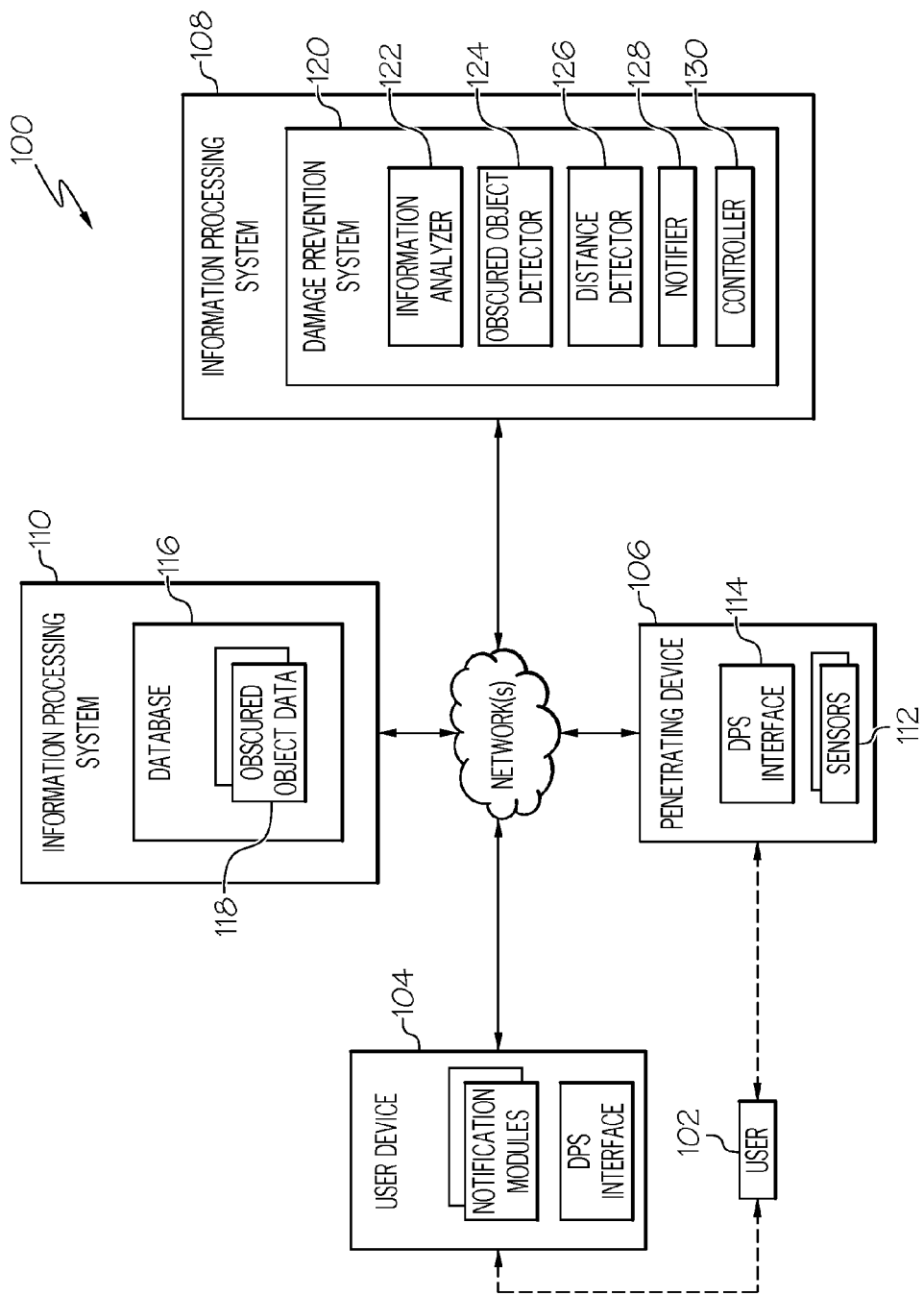
FIG. 1 is a block diagram illustrating one example of an operating environment according to one embodiment of the present disclosure.

FIG. 1 shows an operating environment 100 according to one embodiment of the present disclosure. The operating environment 100 comprises one or more users/operators 102, user devices 104, substrate penetrating devices 106, and information processing systems 108, 110. In one embodiment, at least one of the user devices 104, substrate penetrating devices 106, and information processing systems 108, 110 are communicatively coupled to one or more networks 111. The user(s) 102, in one embodiment, interact with the user device 104 and/or the substrate penetrating device 106. User devices 104 include (but are not limited to) laptop/notebook computers, tablet computers, wearable computers (e.g., computing glasses, watches, etc.), two-way radios, cellular telephones, mobile phones, smartphones, wireless messaging devices, desktop computers, personal digital assistants, and other similar devices. Substrate penetrating devices 106 include (but are not limited to) drills, shovels, backhoes, and any other devices that are capable of penetrating a substrate/surface (e.g., wall, floor, ground, structure, and/or the like) and any underlying material. A substrate penetrating device 106 can also be a device/machine that causes another object to penetrate a substrate/surface and underlying material.

In one embodiment, one or more sensors 112 are disposed on (or at least communicatively coupled to) a penetrating device 106 and generate sensor data 114. These sensors 112 provide real-time sensing of objects, operational parameters of the device 106, a location of the device 106, a location of the penetrating component (drill bit, bucket, chisel, and/or the like) of the device 106, and/or the like. For example, as the penetrating device 106 is penetrating (e.g., digging, drilling, excavating, etc.) a surface/substrate a sensor 112 provides real-time feedback with respect to the detection of an object in the vicinity of a penetrating component of the device 106. In another example, a sensor 112 also provides location information associated with the penetrating component of the device 106. Examples of sensors 112 include (but are not limited to) global positioning system (GPS) devices, metal detectors, wire detectors, magnetic-based sensors, capacitor-based sensors, radio-wave-based sensors, sound pressure wave based sensors, and/or the like.

FIG. 1 also shows that one or more information processing systems 110 maintain at least one database 116 comprising information 118 relating to obscured objects. For example, a set of obscured object information 118 can identify the type of object (e.g., gas pipe, sewage pipe, conduit, electrical wire, communication wire, networking wire, etc.) obscured in a given area, the location of obscured objects in the given area, the composition of the object (e.g., the materials from which the object was made from) and/or the like. The obscured object information 118 is discussed in greater detail below.

FIG. 1 further shows that at least one information processing system 108 in the operating environment 100 comprises a damage prevention system 120 (DPS). The damage prevention system 120 prevents (or at least reduces the likelihood of) a penetrating device 106 from encountering critical objects. A critical object, in one embodiment, is any object whose view is obstructed from the operator 102 of a penetrating device 106, and should not be encountered by the penetrating device 106. Examples of critical objects include (but are not limited to) underground utilities, wiring and pipes within structures, and/or the like. It should be noted that critical objects are also referred to herein as "obstructed objects". In one embodiment, the damage prevention system 120 comprises an information analyzer 122, an object detector 124, a distance detector 126, a notifier 128, and a controller 130. Each of these components is discussed in greater detail below. In one embodiment, the damage prevention system 120 is a trans-vendor service offered by one or more service providers. For example, one or more operations performed by the DPS 120 can be provided by one or more different service providers. However, in other embodiments, the damage prevention system 120 (or at least one of its components) is implemented on a user device 104 and/or a penetrating device 106.

As will be discussed in greater detail below, the DPS 120 utilizes the obscured object information 118 coupled with the sensor data 114 from one or more device sensors 112 to automatically prevent a device 106 from encountering and, thus, damaging obscured object(s). For example, the DPS 120 sends a message or a signal to a DPS interface 132 on the penetrating device 106. This interface 132, in one embodiment, comprises software such as an application and/or hardware such as a wireless transceiver. The interface 132 receives the signal or message from the DPS 120, and automatically stops the penetrating component of the device 106 from penetrating any further. In another example, the DPS 120 sends a message or a signal to a DPS interface 134 on the user device 104 regarding the current state of the penetrating device 106 with respect to any obscured objects. One or more notification modules 136 such as (but not limited to) a display, speaker, haptic module, etc. notify the user of the information received from the DPS 120. Based on this notification, the user is able to determine whether or not to continue drilling, digging, and/or excavating in the current location.

Preventing Damage to Obscured Objects

In one embodiment, the DPS 120 obtains a set of obscured object information 118 from one or more databases 116. In this embodiment, the set of information is obtained based on receiving one or more signals/messages from a user device 102 and/or a penetrating device 106. For example, the DPS interfaces 132, 134 of the user and penetrating devices 104, 106 communicate with the DPS 120 over one or more wireless (or wired) communication links. When a user identifies an area in which he/she intends to drill, dig, or excavate the user sends the location of this area to the DPS 120 using his/her user device 104. In this example, the user is able to send any type of location information such as longitude/latitude coordinates, addresses, cross streets, a portion of a map with the intended area highlighted (e.g., the in intended area circled on the map), and/or the like. The user enters the location information into his/her user device 104 and sends a message to the DPS 120 via the DPS interface 134. In another example, when the user initiates operation of the penetrating device 106 at the intended area at least one of the sensors 112 at the penetrating device 106 gathers location information. The DPS interface 132 of the penetrating device 106 sends a message to the DPS 120 with the location information.

The DPS 120 receives the location information from the user device 104 and/or penetrating device 106 and queries one or more databases 116 for obscured object data 118 associated with the received location information. In one embodiment, the databases 116 are provided by and/or maintained by trans-vendor services, with each service providing obscured object data 118. Obscured object information 118 comprises (but is not limited to) records of builders, utility companies, architects, home owners, Smarter Cities databases, etc.; information on (and searches of) old newspaper articles about initial utility construction, upgrades, and related earlier incidents in the area being considered for digging, drilling, excavating, and/or the like; satellite imagery identifying subtle changes in the surface of the ground in the area being considered for digging, drilling, excavating, and/or the like; feedback from previous decisions by the DPS 120 to stop (or continue) the operation of a penetrating device 106, noting consequences of striking any obscured objects along with the inputs, confidence levels, and distance threshold used to make the decisions; information from police records, crowd sourcing sites for citizen reporting of issues with utilities, house wiring, etc.; and/or the like.

Figure 2:
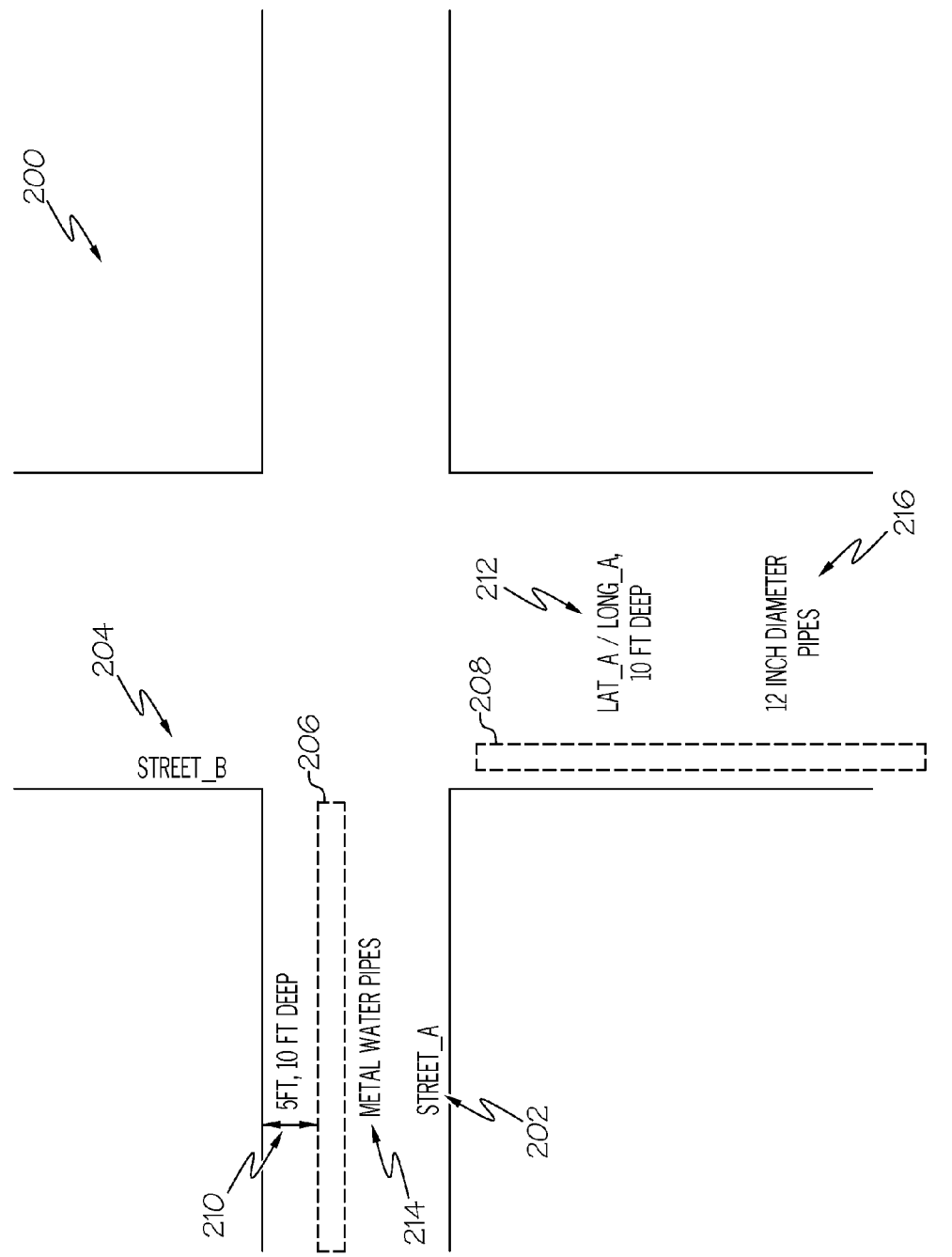
FIG. 2 illustrates one example of obscured object information maintained by one or more databases according to one embodiment of the present disclosure.

FIG. 2 shows one example of obscured object information 118. In particular, FIG. 2 shows a set utility plans 200 for an intersection of a city. The plans 200 comprise street names 202, 204 identifying each of the illustrated streets. The plans 200 further show an illustration of the utility pipes 206, 208 buried at various locations within in the area illustrated by the plans 200. Location information associated with the plans is further provided in the plans 200. For example, FIG. 2 shows that at least first set of location information 210 is provided for a first set of utility pipes 206, and a second set of location information 212 is provided for a second set of utility pipes 208. This first set of location information 210 identifies how far the first set of pipes 205 placed from the curb of Street_A and how deep the pipes are buried underground. The second set of location information 212 comprises longitude/latitude coordinates and depth information associated with the second set of utility pipes 208. In addition to location information, the plans 200 also include information 214 regarding the type of pipes (e.g., metal water pipes) and information 216 regarding the size of the pipes (e.g., 12" diameter).

In one embodiment, the DPS 120 queries the database 116 with the received location information. In this embodiment, a set of obscured object information 118 within the database 116 comprises metadata identifying the location/area associated with the set of obscured object information 118. The database 116 identifies one or more sets of obscured object information 118 (if any) associated with a location/area corresponding to the received location information. The database 116 then returns these sets of obscured object information 118 to the DPS 120.

In another embodiment, the information analyzer 122 of the DPS 120 analyzes obscured object information 118 within the database 118 to identify one or more sets of obscured object information 118 that correspond to the received location information. In this embodiment, the information analyzer 122 parses and processes the metadata identifying the location/area associated with a set of obscured object information 118. If metadata is not provided for a set of obscured object information 118, the information analyzer 122 identifies text within the set of obscured object information 118. Based on the identified text, the information analyzer 122 determines the location/area associated with the set of obscured object information 118.

For example, consider the set of obscured object information 118 shown in FIG. 2 discussed above. In this example, the information analyzer 122 analyzes the set of plans 200 and identifies textual components of the plans 200 such as the street names, latitude/longitude coordinates of the pipes 206, 208, and/or the like. Based on this parsed information the information analyzer 122 determines the location/area associated with this set of obscured object information 118. Once the location/area information is identified for a set of obscured object information 118 the information analyze compares this location/area information with the location information received from the user or penetrating devices 102, 104. If the location information for the set of obscured object information 118 corresponds to the received location information the DPS 120 selects this set of obscured object information 118. For example, if the location information received from the user or penetrating devices 102, 104 comprises coordinates LAT_A/LONG_B, the information analyzer 122 identifies obscured object information with location information corresponding to LAT_A/LONG_B. In this example, the information analyzer identifies obscured object information associated with object(s) OB_1 since this object(s) has location information of LAT_A to LONG_C, which includes LAT_A/LONG_B.

Once the DPS 120 has finished selecting sets of obscured object information 118, the notifier 128 of the DPS 120 sends a message to the user device 104 and/or the penetrating device 106 that it has identified obscured object information 118 for the location/area of interest. The DPS 120 also notifies the user device 104 and/or the penetrating device 106 when obscured object information 118 cannot be found for the location/area of interest.

Figure 3:
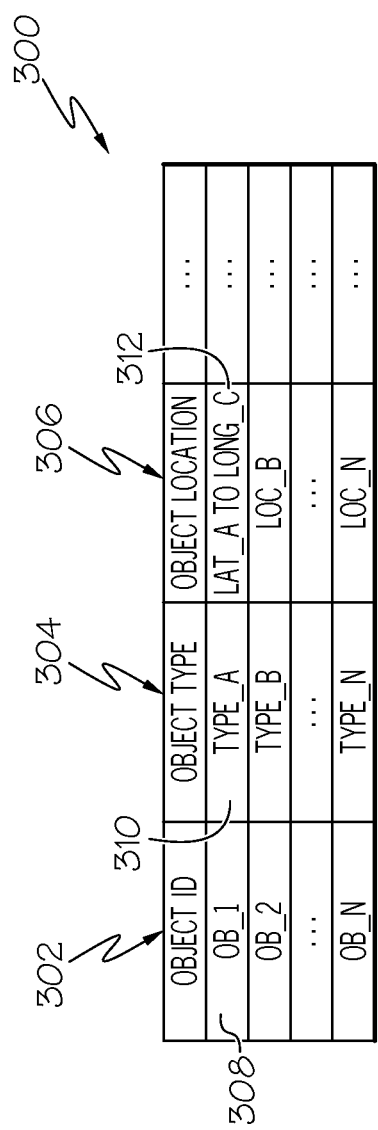
FIG. 3 shows one example of a set of information extracted from obscured object information obtained from one or more databases according to one embodiment of the present disclosure.

In one embodiment, the information analyzer 122 stores information extracted from a set of obscured object information 118 (and/or its metadata). For example, FIG. 3 shows a table comprising information extracted from a plurality of obscured object datasets. In particular, FIG. 3 shows a table 300 where each row is a record associated with a given set of obscured object information 118. In this example, the table 300 comprises a first column 302 entitled "Object ID", a second column 304 entitled "Object Type", and a third column 306 entitled "Object Location". Entries 308 under the first column 302 uniquely identify an object or plurality of objects associated with the record. Entries 310 under the second column 304 identify the type of the obscured object(s) associated with the record. Object types include (but are not limited to) gas pipes, water pipes, sewage pipes, electrical wires, communication wires, networking wires, and/or the like. The information analyzer 122 is able to extract object type information from metadata associated with a set of obscured object information 118 or from the set of obscured object information 118 itself. Entries 312 under the third column 306 include location information associated with the obscured object(s). Location information includes (but is not limited to) longitude/latitude coordinates, depth information, addresses, street names, cross streets, and/or the like. It should be noted that the information shown in the example of FIG. 3 can also be stored within the database 116 as obscured object information 118.

As the penetrating device 106 is being operated one or more of the sensors 112 communicatively coupled to the device 106 gather data 114. For example, a sensor 112 is able to gather data 114 such as the current position of a penetrating device 106 (or penetrating component of the device 106) with respect to surface/substrate being penetrated; operational parameters of the penetrating device 106 such as rotational/hammering speed of the penetrating component, angle of the penetrating component; rate of penetration (e.g., feet per second, meter per second, inches per minute, etc.); and/or the like. It should be noted that the current position can comprise information such as (but not limited to) longitude/latitude coordinates and depth information.

In another example, a sensor 112 is also able to provide data 114 regarding the detection of objects within the vicinity of the penetrating component of the device 106. For example, a sensor can emit and receive electromagnetic fields, sound pressure waves, and/or the like. The sensor 112 gathers data 114 such as received signals and/or signal strength resulting from their object detection operations. As the sensors 112 gather data 114, the DPS interface 134 of the penetrating device 106 sends this data 114 to the DPS 120. In one embodiment, the sensor data 114 is sent in real-time to the DPS 120.

The DPS 120 receives the sensor data 114 from the penetrating device 106, and calculates a confidence value (probability) for the current state of the penetrating device 106. In one embodiment, the confidence value is calculated as a function of the sensor data 114 and the obscured objection information 118 for the location where the device 106 is operating. This confidence value indicates the probability that the penetrating component will or will not encounter an obstructed object within a threshold distance. Stated differently, the DPS 120 calculates a probability of the penetrating device 106 encountering an obstructed object based on the received sensor data 114 and the set of obstructed information 118 for the location.

Consider one example where the DPS 120 receives sensor data 114 such as positional information associated with the penetrating component of the penetrating device 106. In this example, the positional information comprises longitude coordinates, latitude coordinates, and depth information of the penetrating component. The distance detector 126 of the DPS 120 obtains the known or estimated location of the obscured objects in the location/vicinity of the penetrating component 106. The known or estimated location of the obscured objects is identified or determined by the information analyzer 122 based on metadata associated with the obscured object information 118 for the location and/or the obscured object information 118 itself, as discussed above. For example, obscured object information 118 can include location or positional information for obscured objects within a given are. This information comprises longitude/latitude coordinates, depth information, addresses, street names, cross streets, and/or the like. It should be noted that if detailed location information (e.g., longitude/latitude coordinates) is not available for an obscured object the information analyzer 122 can determine or estimate its location from other information within the obscured object information 118. For example, the obscured object information 118 may only identify an intersection of two streets and that an obscure object is 10 feet from the intersection. In this example, the information analyzer 122 obtains the longitude/latitude coordinates of the intersection from geographic information system databases. The information analyzer 122 then uses the longitude/latitude coordinates of the intersection with the known distance (e.g., 10 feet) of the obscured object from the intersection to estimate the longitude/latitude coordinates of the obscured object. In one embodiment, the information analyzer 122 generates a map comprising one or more locations associated with a probability (confidence values) that the obscured objected is at the location.

The distance detector 124 compares the positional information received from the penetrating device 104 with the known or estimated location of the obscured objects in the location. The distance detector 124 then determines (or estimates) the distance between the penetrating component of the device 106 and the obscured objects. The DPS 120 compares this distance to a distance threshold and calculates a confidence value based on this comparison. In one embodiment, the distance threshold is a distance from an obscured object at which the DPS 120 should automatically stop the operation of the penetrating device 106 and/or its penetrating component and/or notify the user 102 to stop the operation of the penetrating device 106 and/or its penetrating component. The confidence value indicates how likely the penetrating component of the device 106 is to encounter an obscured object if its operation is continued. In one embodiment, the confidence level increase as the distance between the penetrating component and the obscured object decreases. Alternatively, the confidence value can indicate how likely the penetrating component of the device 106 is to avoid encountering any obscured object if its operation is continued. In this embodiment, the confidence level decreases as the distance between the penetrating component and the obscured object decreases.

It should be noted that in an embodiment where a map was generating with locations of probabilities, the distance detector 124 compares the location of the penetrating device 104 one or more locations identified in the map. In this embodiment, the distance detector 124 determines (or estimates) the distance between the penetrating component of the device 106 and one or more of the locations identified in the map. The DPS 120 compares this distance to the distance threshold and calculates a confidence value based on this comparison to determine whether or not the DPS 120 should automatically stop the operation of the penetrating device 106 and/or its penetrating component and/or notify the user 102 to stop the operation of the penetrating device 106 and/or its penetrating component.

Once the confidence value reaches a given threshold value, the DPS 120 automatically prevents the penetrating component of the device 106 from encountering the obscured object. In another embodiment, once the distance between the penetrating component and an obscured object reaches a given threshold, the DPS 120 automatically prevents the penetrating component of the device 106 from encountering the obscured object. In these embodiments, the controller 128 of the DPS 120 sends one or more signals/messages to the DPS interface of the penetrating device 106 to automatically shut down the device and/or its penetrating component. The DPS interface 106 then disables the device 106 and/or is penetrating component. For example, the DPS interface 106 can send a message or signal to a control unit of the device 106. Upon receiving this message/signal the control unit disables the device 106 and/or is penetrating component. In another example, the DPS interface 106 sends a message or signal to a component such as a switch that is coupled to the penetrating component of the device 106. When the switch receives the signal from the DPS interface 106 it opens a circuit, which disables the penetrating component.

Figure 4:
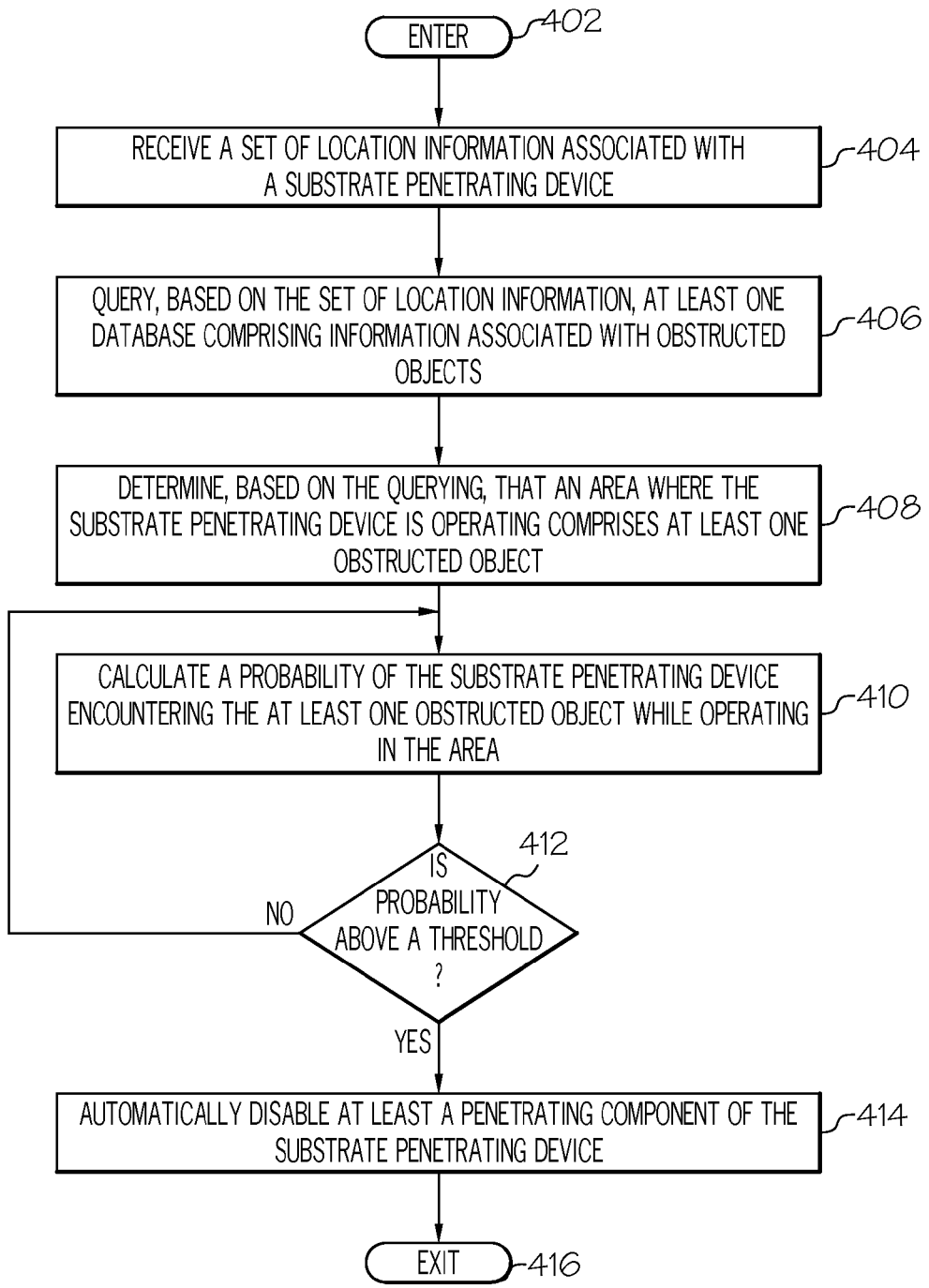
FIG. 4 is an operational flow diagram illustrating one example of a process for managing the operation of a substrate penetrating device according to one embodiment of the present disclosure.

It should be noted that, in other embodiments, once the confidence value reaches a given threshold value the DPS 120 sends one or more messages/signals to the user device 106. The DPS interface 134 of the user device 104 receives the message and displays one or more notifications to the user. For example, FIG. 4 shows one example of a user interface 402 for a user device 104. In this example, a message 404 is displayed to the user indicating that an object has been detected. The user can then determine whether or not he/she wants to manually disable the device 104 and/or its penetrating component. It should be noted that the DPS interface 134 of the user device 104 can notify the user of a detected object using various mechanisms such as (but not limited to) test, colors, patterns, images, video, audio, haptic feedback, and/or the like.

In another embodiment, the DPS interface 134 of the user device 104 provides real-time feedback to the user as he/she is operation the device 106. For example, as the user is operating the device 106 a first notification such as (but not limited to) a flashing green symbol can be displayed/presented to the user via the user device 104. This first notification indicates that no obstructed objects have been detected and operation can continue as normal. However, when the DPS interface 134 receives a signal/message from the DPS 120 that an obstructed object has been detected and is within a given threshold of penetrating device/component 106, a second notification such as (but not limited to) a red flashing symbol can be displayed/presented to the user via the user device 104. This second notification indicates to the user that the penetrating device 106 should be deactivated or at least operated with caution.

In some embodiments the penetrating device 106 comprises an object detector, such as a metal detector, for detecting obstructed objects. However, in other embodiments, a stand-alone handheld object detector may be utilized to detect obstructed objects. These types of detectors generally utilize internal electronics to condition a feedback signal to the user. The signal is used to indicate the likelihood that specific types of metal objects are present in the space below a detector coil of the detector.

In one embodiment, the object detector comprises a DPS interface similar to that discussed above. The DPS interface communicates with the DPS 120, which can be implemented within the object detector. The DPS 120 performs queries of remote databases 116 for obstructed object information 118 associated with the location of the object detector. The DPS 120 dynamically changes parameters of the device electronics based on the obstructed object information 118 obtained from querying the databases 116. The DPS 120 influences the likelihood calculation and subsequent feedback to the user of the object detector.

In one embodiment, the DPS 120 directly alerts the user to the presence of objects identified from the databases 116 and a signal to the user as a direct result of the database query. However, in another embodiment, the DPS 120 does not directly alert the user to the presence of mapped objects nor does the DPS 120 signal the user as a direct result of the database query. In this embodiment, the DPS 120 utilizes a Bayesian model influence/configure signal detection properties of the object detector. The Bayesian model combines signals from the detector coil and the database together with dynamic adjustments to the parameters that tune the coil and detection electronics. This allows the user to be differentially signaled during a search, thereby optimizing the user experience to detect particular qualities of the environment. For example, a user may notify the DPS 120 that he/she is searching for buried gas lines in a given area. The DPS 120 performs one or more database queries and identifies obstructed object information 118 such as (but not limited to) maps of the area indicating that utility lines are present and/or an identification of the types of materials that the utility lines are made from. In this example, the DPS 120 determines from the obtained information 118 that the area comprises water lines made from iron and gas lines made from copper. Therefore, the DPS 120 communicates with the DPS interface of the object detector and automatically adjusts the device's operating parameters to become more sensitive to copper and less sensitive to iron. This allows the user to quickly search the area for all buried gas lines without stopping to rule out false alarms from buried water pipes.

Operational Flow Diagram

FIG. 4 is an operational flow diagram illustrating one example of a process for managing the operation of a substrate penetrating device. The operational flow diagram of FIG. 4 beings at step 402 and flows directly to step 404. The DPS 120, at step 404, receives a set of location information associated with a substrate penetrating device 106. The DPS 120, at step 406, queries at least one database 116 comprising information 118 associated with obstructed objects based on the set of location information. The DPS 120, at step 408, determines that the area where the substrate penetrating device 106 is operating comprises at least one obstructed object based on the querying. The DPS 120, at step 410, calculates a probability of the substrate penetrating device 106 encountering the at least one obstructed object while operating in the area. In one embodiment, The DPS 120, at step 412, determines if the probability is above a threshold. If the result of this determination is negative, the DPS 120 receives new location information associated with the substrate penetrating device 106 and the control flow returns to step 410. If the result of this determination is positive, the DPS 120, at step 414, automatically disables at least a penetrating component of the substrate penetrating device 106 to present damage to the obstructed object. The control flow exits at step 416.

Information Processing System

Figure 5:
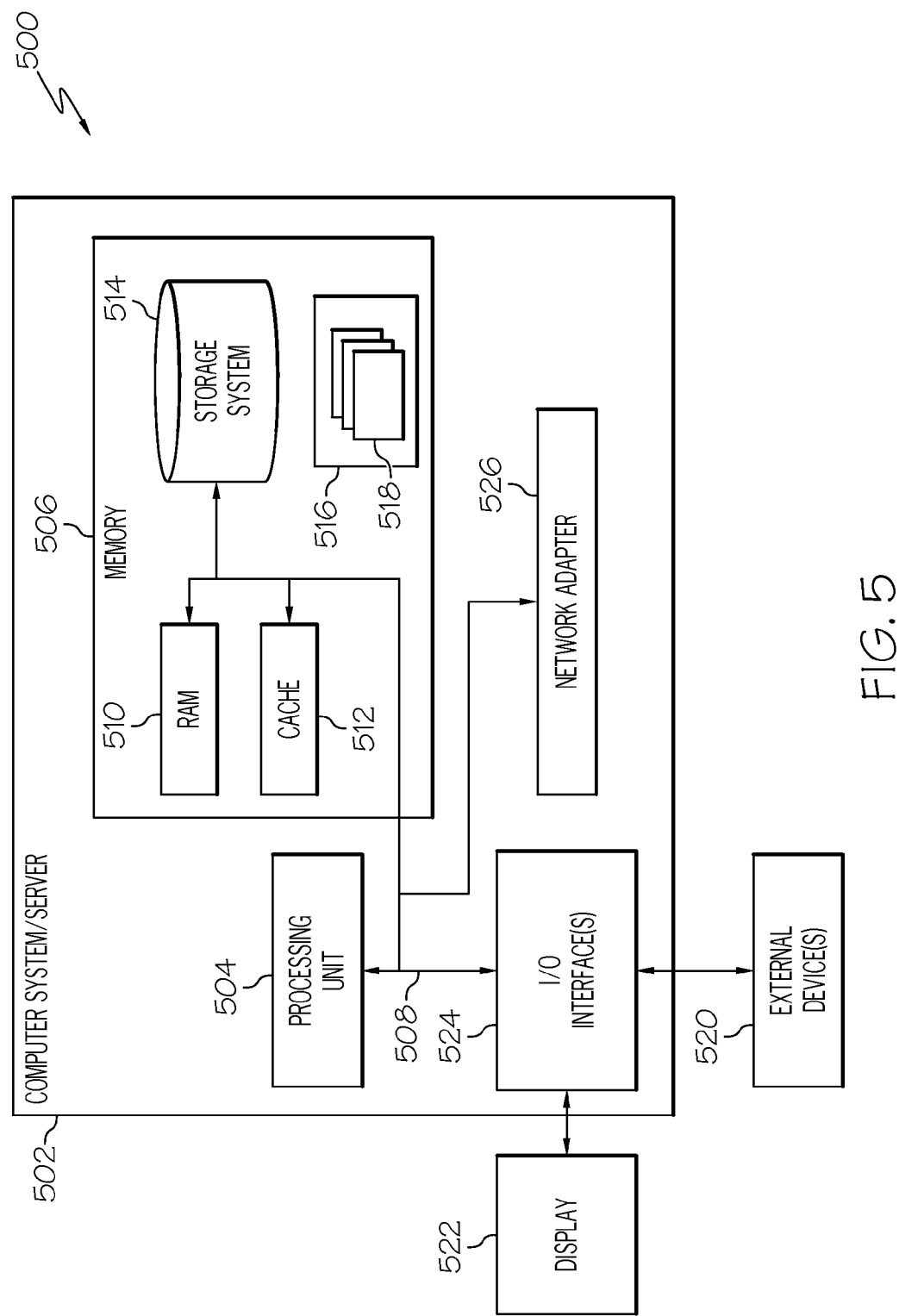
FIG. 5 is a block diagram illustrating one example of an information processing system according to one embodiment of the present disclosure.

Referring now to FIG. 5, this figure is a block diagram illustrating an information processing system that can be utilized in various embodiments of the present disclosure. The information processing system 502 is based upon a suitably configured processing system configured to implement one or more embodiments of the present disclosure. Any suitably configured processing system can be used as the information processing system 502 in embodiments of the present disclosure. The components of the information processing system 502 can include, but are not limited to, one or more processors or processing units 504, a system memory 506, and a bus 508 that couples various system components including the system memory 506 to the processor 504.

The bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 5, the main memory 506 includes at least the DPS 120 and its components shown in FIG. 1. Each of these components can reside within the processor 504, or be a separate hardware component. The system memory 506 can also include computer system readable media in the form of volatile memory, such as random access memory (RAM) 510 and/or cache memory 512. The information processing system 502 can further include other removable/non-removable, volatile/non-volatile computer system storage media. By way of example only, a storage system 514 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 508 by one or more data media interfaces. The memory 506 can include at least one program product having a set of program modules that are configured to carry out the functions of an embodiment of the present disclosure.

Program/utility 516, having a set of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of embodiments of the present disclosure.

The information processing system 502 can also communicate with one or more external devices 520 such as a keyboard, a pointing device, a display 522, etc.; one or more devices that enable a user to interact with the information processing system 502; and/or any devices (e.g., network card, modem, etc.) that enable computer system/server 502 to communicate with one or more other computing devices. Such communication can occur via I/O interfaces 524. Still yet, the information processing system 502 can communicate with one or more networks such as a local area network (LAN), a general wide area network (WAN), and/or a public network (e.g., the Internet) via network adapter 526. As depicted, the network adapter 526 communicates with the other components of information processing system 502 via the bus 508. Other hardware and/or software components can also be used in conjunction with the information processing system 502. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing an operation of a substrate penetrating device, the method comprising:
   receiving a set of location information associated with a substrate penetrating device;
   querying, based on the set of location information, at least one database comprising information associated with obstructed objects;
   receiving, based on the querying, a set of information associated with the at least one obstructed object;
   determining, based on receiving the set of information, that an area where the substrate penetrating device is operating comprises at least one obstructed object;
   identifying, based on receiving the set of information, at least one material within the at least one obstructed object;
   automatically adjusting at least one operating parameter of an object detector coil communicatively coupled to the substrate penetrating device based on the at least one material that has been identified;
   after the at least one operating parameter has been automatically adjusted, calculating a probability of the substrate penetrating device encountering the at least one obstructed object while operating in the area;
   determining if the probability is above a threshold;
   automatically disabling at least a penetrating component of the substrate penetrating device based on the probability being above the threshold; and
   allowing the substrate penetrating device to continue operating based on the probability being below the threshold.

2. The method of claim 1, wherein the determining comprises:
   receiving, from the at least one database, a set of information associated with the at one obstructed object;
   analyzing the set of information;
   estimating, based on the analyzing, a location of the at least one obstructed object; and
   comparing the set of location information received from the at least one substrate penetrating device with the estimated location of the at least one obstructed object.

3. The method of claim 1, further comprising:
   notifying at least one of
   an operator of the substrate penetrating device, and
   the substrate penetrating device
   of a probability of the substrate penetrating device encountering the at least one obstructed object.

4. The method of claim 1, wherein the probability is calculated based on:
   determining a current location associated with the substrate penetrating device;
   comparing the current location to an estimated location of the at least one obstructed object, wherein the estimated location is determined based on the querying of the at least one database; and
   determining, based on the comparing, a distance between the current location associated with the substrate penetrating device and one of a known and estimated location of the at least one obstructed object.

5. The method of claim 1, wherein the probability is calculated based on:
   determining a current location associated with the substrate penetrating device;
   comparing the current location to a map comprising one or more identified locations, wherein each of the identified locations is associated with a probability that the obscured object is at the location; and
   determining, based on the comparing, a distance between the current location associated with the substrate penetrating device and the one or more locations identified in the map.

6. The method of claim 1, further comprising:
   notifying an operator that the substrate penetrating device is likely to encounter the at least one obstructed object based on the probability being above the threshold.

7. The method of claim 6, wherein the notifying comprises sending at least one notification to a user device associated with the operator.

8. An information processing system for managing an operation of a substrate penetrating device, the information processing system comprising:
   a memory;
   a processor communicatively coupled to the memory; and
   a damage prevention system communicatively coupled to the memory and the processor, wherein the damage prevention system is configured to perform a method comprising:
      receiving a set of location information associated with a substrate penetrating device;
      receiving, based on the querying, a set of information associated with the at least one obstructed object;
      determining, based on receiving the set of information, that an area where the substrate penetrating device is operating comprises at least one obstructed object;
      identifying, based on receiving the set of information, at least one material within the at least one obstructed object;
      automatically adjusting at least one operating parameter of an object detector coil communicatively coupled to the substrate penetrating device based on the at least one material that has been identified;
      after the at least one operating parameter has been automatically adjusted, calculating a probability of the substrate penetrating device encountering the at least one obstructed object while operating in the area;

determining if the probability is above a threshold;

automatically disabling at least a penetrating component of the substrate penetrating device based on the probability being above the threshold; and allowing the substrate penetrating device to continue operating based on the probability being below the threshold.

9. The information processing system of claim 8, wherein the determining comprises:

receiving, from the at least one database, a set of information associated with the at one obstructed object;

analyzing the set of information;

estimating, based on the analyzing, a location of the at least one obstructed object; and comparing the set of location information received from the at least one substrate penetrating device with the estimated location of the at least one obstructed object.

10. The information processing system of claim 8, wherein the probability is calculated based on:

determining a current location associated with the substrate penetrating device;

comparing the current location to an estimated location of the at least one obstructed object, wherein the estimated location is determined based on the querying of the at least one database; and determining, based on the comparing, a distance between the current location associated with the substrate penetrating device and one of a known and estimated location of the at least one obstructed object.

11. The information processing system of claim 8, further comprising:

notifying an operator that the substrate penetrating device is likely to encounter the at least one obstructed object based on the probability being above the threshold.

12. A computer program storage product for managing an operation of a substrate penetrating device, the computer program storage product comprising instructions configured to perform a method comprising:

receiving a set of location information associated with a substrate penetrating device;

querying, based on the set of location information, at least one database comprising information associated with obstructed objects;

receiving, based on the querying, a set of information associated with the at least one obstructed object;

determining, based on receiving the set of information, that an area where the substrate penetrating device is operating comprises at least one obstructed object;

identifying, based on receiving the set of information, at least one material within the at least one obstructed object;

automatically adjusting at least one operating parameter of an object detector coil communicatively coupled to the substrate penetrating device based on the at least one material that has been identified;

after the at least one operating parameter has been automatically adjusted, calculating a probability of the substrate penetrating device encountering the at least one obstructed object while operating in the area;

determining if the probability is above a threshold;

automatically disabling at least a penetrating component of the substrate penetrating device based on the probability being above the threshold; and allowing the substrate penetrating device to continue operating based on the probability being below the threshold.

13. The computer program storage product of claim 12, wherein the determining comprises:

receiving, from the at least one database, a set of information associated with the at one obstructed object;

analyzing the set of information;

estimating, based on the analyzing, a location of the at least one obstructed object; and comparing the set of location information received from the at least one substrate penetrating device with the location of the at least one obstructed object.

14. The computer program storage product of claim 12, further comprising:

notifying at least one of
an operator of the substrate penetrating device, and
the substrate penetrating device that the area comprises the at least one obstructed object.

15. The computer program storage product of claim 12, wherein the probability is calculated based on:

determining a current location associated with the substrate penetrating device;

comparing the current location to an estimated location of the at least one obstructed object, wherein the estimated location is determined based on the querying of the at least one database; and determining, based on the comparing, a distance between the current location associated with the substrate penetrating device and one of a known and estimated location of the at least one obstructed object.

16. The computer program storage product of claim 12, further comprising:

notifying an operator that the substrate penetrating device is likely to encounter the at least one obstructed object based on the probability being above the threshold.

* * * * *